(12) United States Patent
Saitou et al.

(10) Patent No.: US 7,533,652 B2
(45) Date of Patent: May 19, 2009

(54) CONTROL DEVICE FOR VEHICLE HAVING COOPERATIVE CONTROL FUNCTION

(75) Inventors: Yoshiharu Saitou, Wako (JP); Hiroyuki Takeo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/019,215

(22) Filed: Jan. 24, 2008

(65) Prior Publication Data
US 2008/0178837 A1 Jul. 31, 2008

(30) Foreign Application Priority Data
Jan. 25, 2007 (JP) ............................. 2007-014558

(51) Int. Cl.
*F02D 1/00* (2006.01)
*G06F 19/00* (2006.01)

(52) U.S. Cl. ........................ 123/332; 701/110; 477/107

(58) Field of Classification Search ................. 123/319, 123/320, 325, 332; 701/103, 104, 110, 112; 477/107, 117, 166, 170, 171
See application file for complete search history.

(56) References Cited

U.S. PATENT DOCUMENTS

| | | | | |
|---|---|---|---|---|
| 5,520,594 | A | * | 5/1996 | Fukasawa et al. ............ 477/173 |
| 6,363,313 | B1 | * | 3/2002 | Katoh et al. ................. 701/104 |
| 6,749,534 | B2 | * | 6/2004 | Watanabe et al. ............ 477/107 |
| 2006/0027413 | A1 | * | 2/2006 | Tabata et al. ................. 180/305 |

FOREIGN PATENT DOCUMENTS

| JP | 3-50895 B2 | 8/1991 |
|---|---|---|
| JP | 09-086227 B2 | 3/1997 |

* cited by examiner

*Primary Examiner*—John T Kwon
(74) *Attorney, Agent, or Firm*—Arent Fox LLP.

(57) ABSTRACT

A control device for a vehicle for cooperatively controlling the engagement of a lock-up clutch and the conditions of fuel cut. When the rotational speed of an input shaft of a transmission becomes greater than a predetermined value during deceleration running in the condition where a throttle valve is fully closed, the lock-up clutch is engaged. Thereafter, the fuel cut start engine speed increased by a predetermined value is changed to a normal fuel cut start engine speed, at which the fuel cut is started. Accordingly, engine brake can be produced at a lower vehicle speed as compared with the prior art.

3 Claims, 8 Drawing Sheets

FIG.7

CONTROL DEVICE FOR VEHICLE HAVING COOPERATIVE CONTROL FUNCTION

BACKGROUND OF THE INVENTION

1. Field of the Invention

The present invention relates generally to a control device for a vehicle, and more particularly to a control device for a vehicle for cooperatively controlling fuel cut at deceleration and the engagement of a lock-up clutch.

2. Description of the Related Art

In a general vehicular engine, the supply of fuel to the engine is cut off at deceleration under given conditions, i.e., so-called fuel cut is performed, so as to improve the fuel economy. In a deceleration fuel cut method, a fuel cut execution decision engine speed and a return decision engine speed are set, and a fuel cut execution condition is determined according to a throttle valve opening angle. If the fuel cut execution condition is satisfied, it is determined whether or not the engine speed is higher than the fuel cut execution decision engine speed. If the engine speed is higher than the fuel cut execution decision engine speed, the supply of fuel to the engine is cut off after the elapse of a predetermined time from the time of satisfaction of the fuel cut execution condition.

When the engine speed becomes lower than the return decision engine speed after the execution of the fuel cut, the supply of fuel to the engine is restored, and the fuel cut execution decision engine speed is increased by a predetermined value for a predetermined time period from the time of restoration of the fuel supply. Thus, the fuel cut execution decision engine speed is increased by a predetermined value for a predetermined time after the supply of fuel to the engine is restored. Accordingly, it is possible to prevent the occurrence of hunting of engine speed such that the fuel cut and the fuel supply restoration are repeated after the fuel supply is restored.

Further, in general, an automatic transmission having a torque converter includes a lock-up clutch for directly connecting an output shaft of the engine and an input shaft of the automatic transmission in the condition where the gear position of the automatic transmission is a predetermined gear position and the rotational speed of the engine is greater than or equal to a predetermined rotational speed, in order to improve the fuel economy. In the case that such an automatic transmission with a lock-up clutch is combined with an engine having a fuel cut mechanism, various proposals have been made on the relation between an engine speed at the time of shifting to a lock-up condition and an engine speed at the time of restoration of the fuel supply after the fuel cut, in order to further improve the fuel economy as maintaining the drivability.

As mentioned above, to prevent the engine hunting due to the fuel cut during deceleration running, the fuel cut is not permitted until the engine speed becomes greater than the normal fuel cut execution decision engine speed in the condition where the accelerator pedal is kept undepressed after restoration from the fuel cut. Such control has a problem such that when the vehicle is accelerated by a running resistance and an acceleration of gravity from a very low vehicle speed without depression of the accelerator pedal on a downhill road in particular, engine brake by the fuel cut is not produced until reaching a high vehicle speed, causing a reduction in drivability due to a sense of free running. Further, the frequency of braking operations is increased to maintain the vehicle speed, resulting in an increase in brake load.

SUMMARY OF THE INVENTION

It is therefore an object of the present invention to provide a control device for a vehicle which can produce engine brake on a downhill road at a lower vehicle speed as compared with the prior art by cooperatively controlling the engagement of a lock-up clutch and the conditions of fuel cut.

In accordance with an aspect of the present invention, there is provided a control device for a vehicle including a fuel supply control device for an engine having fuel cutting means for cutting off the supply of fuel to the engine when the engine speed has become greater than or equal to a first predetermined speed during deceleration running in the condition where the throttle angle is less than or equal to a predetermined angle, fuel supplying means for supplying fuel to the engine when the engine speed has become a second predetermined speed less than the first predetermined speed after the fuel cut by the fuel cutting means, and fuel cut engine speed changing means for changing the engine speed at which the fuel cutting means operates to a third predetermined speed greater than the first predetermined speed when the fuel supplying means has been operated; an automatic transmission having a torque converter with a lock-up clutch; lock-up preparing means for starting the supply of hydraulic pressure for operating the lock-up clutch of the automatic transmission when the main shaft speed in the automatic transmission has become a fourth predetermined speed greater than the first predetermined speed and less than the third predetermined speed during the fuel supply to the engine in the condition where the throttle angle is less than or equal to the predetermined angle and the fuel cut engine speed has been changed to the third predetermined speed by the fuel cut engine speed changing means; lock-up determining means for determining that the lock-up clutch has been engaged when the engine speed is equal to the main shaft speed; and fuel cut engine speed returning means for returning the engine speed at which the fuel cutting means operates from the third predetermined speed to the first predetermined speed when the engagement of the lock-up clutch has been determined by the lock-up determining means.

According to this configuration, during running on a downhill road at low vehicle speeds, engine brake can be produced at a lower vehicle speed without the occurrence of engine hunting due to the fuel cut, so that the drivability can be improved. Further, during running on a general road, the frequency of running in the condition where no fuel cut is performed, i.e., in the condition where a sense of free running is felt can be reduced, so that the improvement in drivability and fuel economy can be expected.

Preferably, the control device further includes slope determining means for determining a road surface slope; wherein when the gear position is a high gear position, the fuel cut engine speed returning means operates from on a gentle downhill road to on a steep downhill road, whereas when the gear position is a low gear position, the fuel cut engine speed returning means operates on only a steep downhill road having a slope greater than or equal to a predetermined value. With this configuration, the fuel cut engine speed return control is performed according to the slope of a downhill road and the gear position, so that the improvement in drivability and fuel economy can be expected.

Preferably, when the fuel cut is not started even after the elapse of a predetermined time after the request for the change of the fuel cut start engine speed by the fuel cut engine speed returning means, the lock-up clutch is disengaged. With this configuration, the engine speed is increased by the disengagement of the lock-up clutch, so that the fuel cut can be easily started and the improvement in fuel economy can therefore be expected.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
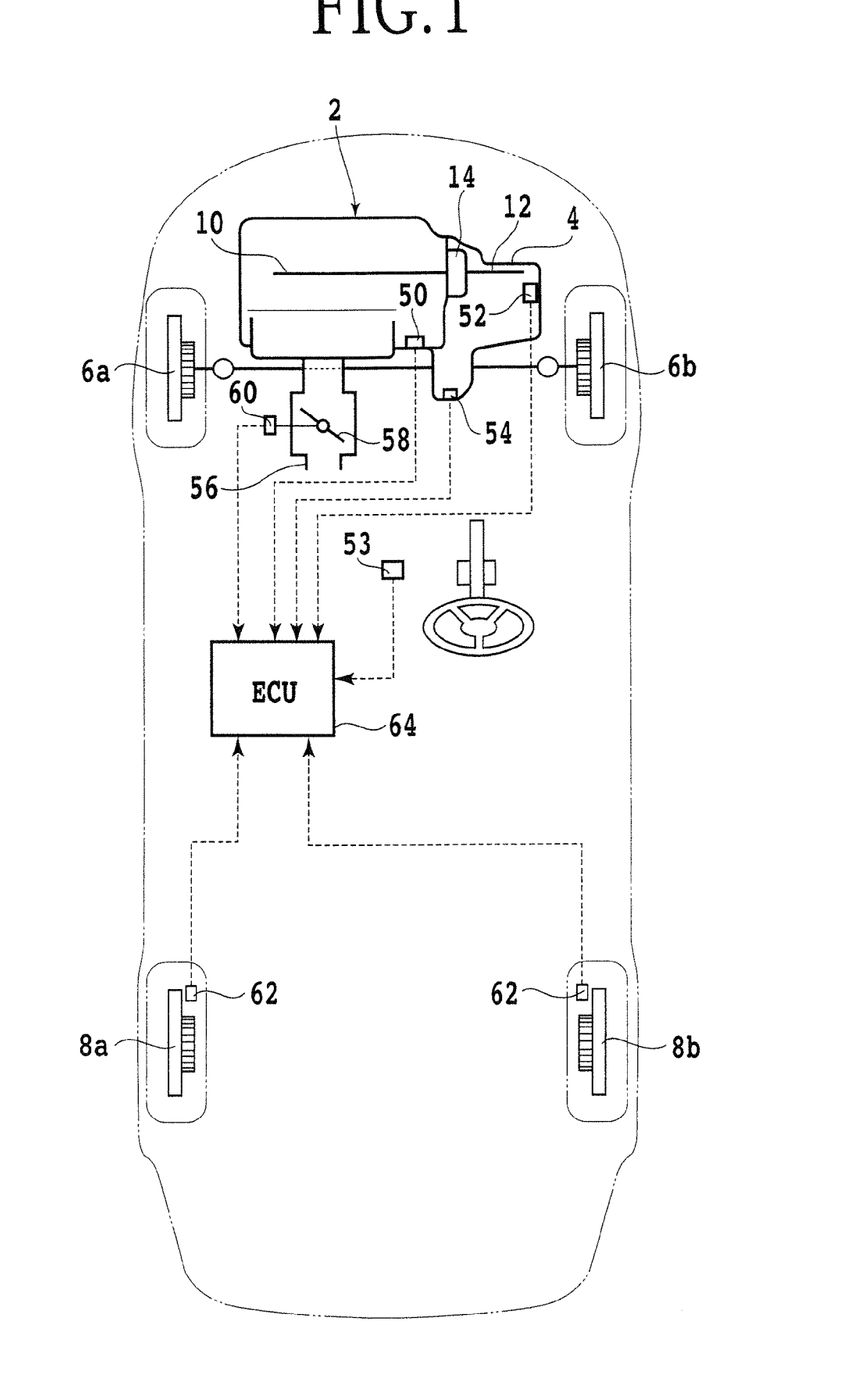
FIG. 1 is a schematic plan view showing a general configuration of a vehicle including a deceleration LC/FI cooperative control device according to the present invention.
Figure 3:
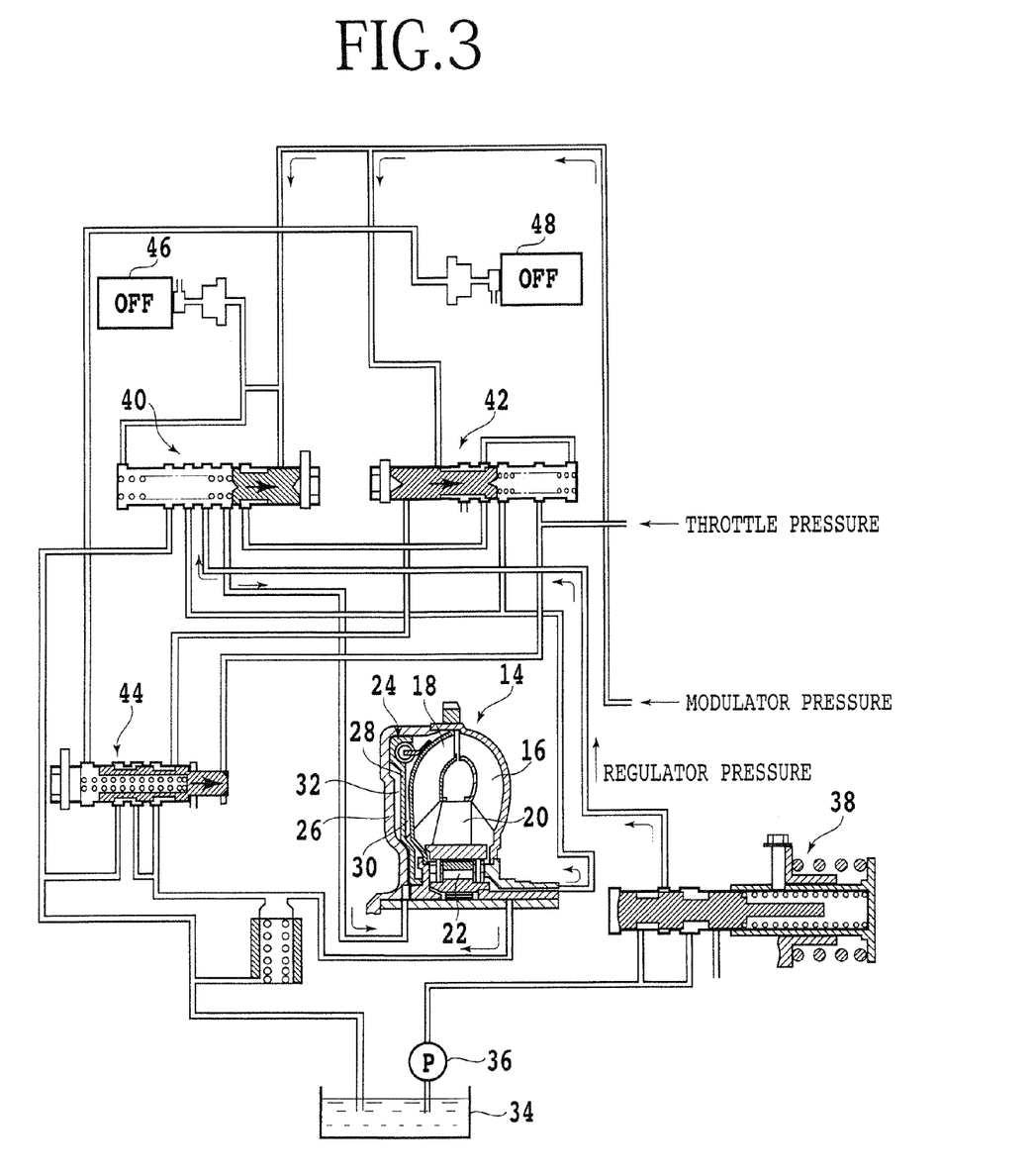
FIG. 3 is a hydraulic circuit diagram of a torque converter in disengaging a lock-up clutch.
Figure 4:
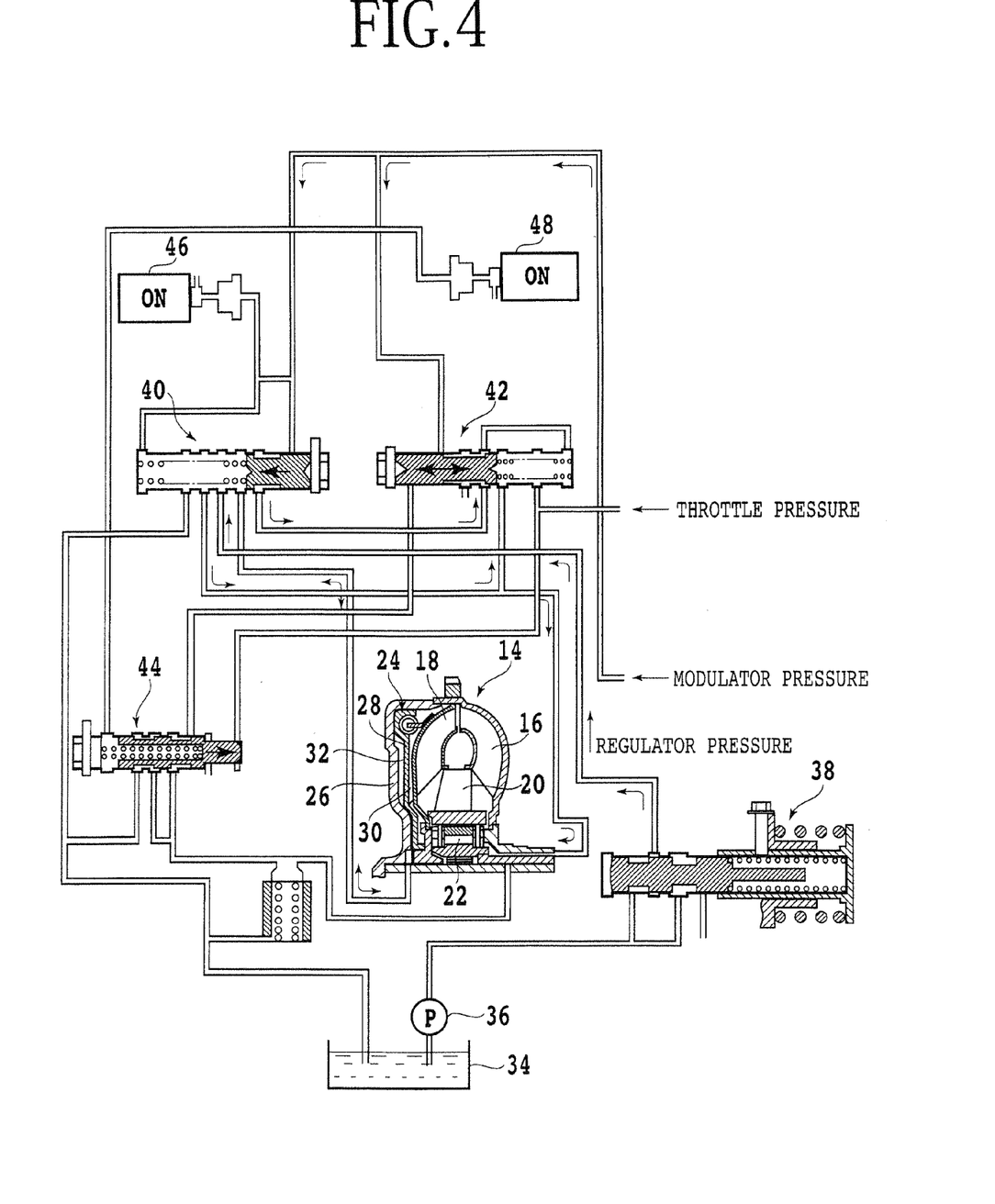
FIG. 4 is a hydraulic circuit diagram of the torque converter in engaging the lock-up clutch.

FIG. 1 is a schematic plan view showing a general configuration of a vehicle including the control device according to the present invention. This vehicle is a front-wheel drive vehicle, which includes a pair of left and right drive wheels 6a and 6b to which the torque of an engine 2 is transmitted through an automatic transmission 4 and a pair of left and right driven wheels 8a and 8b rotating with running of the vehicle. A known torque converter 14 is interposed between a crankshaft 10 of the engine 2 and a main shaft 12 of the automatic transmission 4. Referring to FIG. 3, there is shown a hydraulic circuit diagram of the torque converter 14 in disengaging a lock-up clutch. FIG. 4 is a hydraulic circuit diagram of the torque converter 14 in engaging the lock-up clutch.

As shown in FIG. 3, the torque converter 14 includes a pump impeller 16 connected to the crankshaft 10, a turbine runner 18 connected to the main shaft 12, a stator 20 supported through a one-way clutch 22 to a fixed portion, and a lock-up clutch 24 adapted to connect the pump impeller 16 and the turbine runner 18. The lock-up clutch 24 includes a clutch piston 28 adapted to abut against the inner surface of a torque converter cover 26. A first oil chamber 30 and a second oil chamber 32 are formed on both sides of the clutch piston 28.

When pressurized oil is supplied to the first oil chamber 30 to bring the clutch piston 28 into abutment against the torque converter cover 26, the lock-up clutch 24 is engaged to thereby transmit the torque of the crankshaft 10 directly to the main shaft 12. Conversely, when pressurized oil is supplied to the second oil chamber 32 to bring the clutch piston 28 into separation from the torque converter cover 26, the lock-up clutch 24 is disengaged to thereby break the mechanical connection between the crankshaft 10 and the main shaft 12.

The hydraulic circuit of the torque converter 14 includes an oil pump 36 for pumping up a hydraulic fluid from an oil tank 34 and a regulator valve 38 for regulating the pressure of the hydraulic fluid from the oil pump 36 to a predetermined regulator pressure. A lock-up shift valve 40 functions to transmit the regulator pressure to the second oil chamber 32 of the torque converter 14 and to connect the first oil chamber 30 to the oil tank 34 when the lock-up clutch 24 is disengaged, whereas functions to transmit the regulator pressure to the first oil chamber 30 of the torque converter 14 and to connect the second oil chamber 32 to a lock-up control valve 42 which will be hereinafter described when the lock-up clutch 24 is engaged.

The lock-up control valve 42 functions to relieve the pressure of the hydraulic fluid supplied from the second oil chamber 32 through the lock-up shift valve 40 and to thereby regulate the pressure in the second oil chamber 32, thereby controlling an engagement force of the lock-up clutch 24. A lock-up timing valve 44 is operated by a throttle pressure at a high vehicle speed to thereby operate the lock-up control valve 42, thereby making the second oil chamber 32 open to the atmosphere to fully engage the lock-up clutch 24.

A first solenoid valve 46 is an on/off controlled valve. When the first solenoid valve 46 is turned off, a modulator pressure is transmitted to the left end of the lock-up shift valve 40 to rightward move the spool of the lock-up shift valve 40, so that the regulator pressure is transmitted to the second oil chamber 32 of the torque converter 14, and the first oil chamber 30 is connected to the oil tank 34, thereby disengaging the lock-up clutch 24. When the first solenoid valve 46 is turned on, the modulator pressure is relieved to leftward move the spool of the lock-up shift valve 40, so that the regulator pressure is transmitted to the first oil chamber 30 of the torque converter 14, and the second oil chamber 32 is connected to the lock-up control valve 42, thereby engaging the lock-up clutch 24.

A second solenoid valve 48 is a linear solenoid valve. When the second solenoid valve 48 is turned off, the modulator pressure is transmitted to the lock-up control valve 42 and the lock-up timing valve 44 to rightward bias the spool of the lock-up control valve 42 and the spool of the lock-up timing valve 44. When the second solenoid valve 48 is turned on, the modulator pressure is relieved to cancel the above-mentioned biasing force. The degree of opening of the lock-up control valve 42 can be steplessly controlled by changing the value of a current supplied to the second solenoid valve 48. When the degree of opening of the lock-up control valve 42 is increased, the back pressure in the second oil chamber 32 of the torque converter 14 is decreased to thereby increase the engagement force of the lock-up clutch 24. Conversely, when the degree of opening of the lock-up control valve 42 is decreased, the back pressure in the second oil chamber 32 of the torque converter 14 is increased to thereby decrease the engagement force of the lock-up clutch 24.

Referring again to FIG. 1, the engine 2 is provided with engine speed detecting means 50 for detecting an engine speed Ne, and the automatic transmission 4 is provided with main shaft speed detecting means 52 for detecting a main shaft speed Nm and shift position detecting means 54 for detecting a shift position P. A throttle valve 58 is provided in an intake passage 56. The throttle valve 58 is provided with throttle angle detecting means 60 for detecting a throttle angle $\theta_{TH}$. Further, each of the rear wheels 8a and 8b as the driven wheels is provided with vehicle speed detecting means 62 for detecting a vehicle speed V. Reference numeral 53 denotes slope detecting means for detecting the slope of a road surface on which the vehicle is running. In this preferred embodiment, a G sensor for computing the slope from a longitudinal acceleration G of the vehicle is used as the slope detecting means 53. As a modification, the slope detecting means 53 may be provided by means for directly detecting the angle of inclination of a vehicle body with respect to a horizontal plane.

Figure 2:
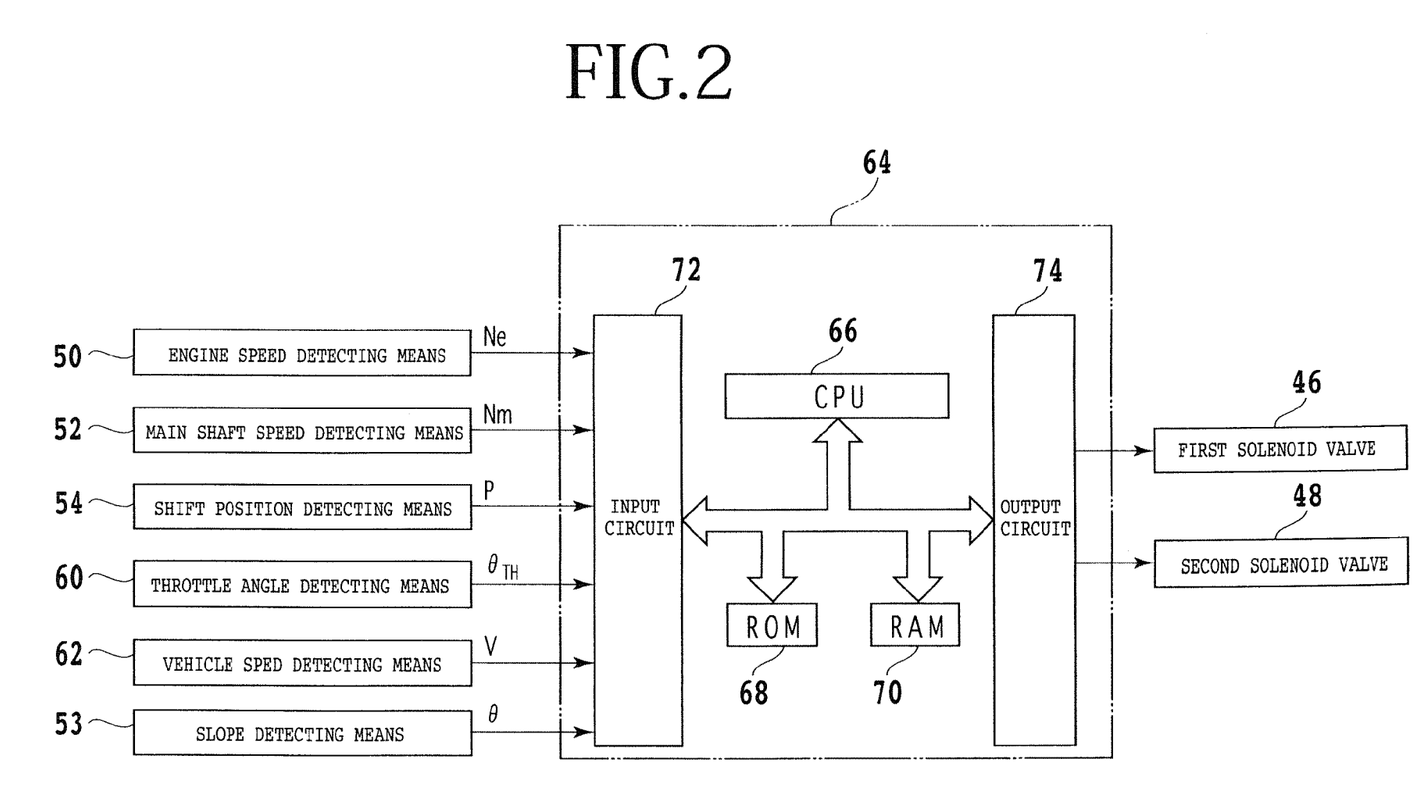
FIG. 2 is a block diagram of an electronic control unit.

FIG. 2 shows an electronic control unit (ECU) 64 for performing computations on output signals from the various detecting means mentioned above according to a control program and driving the first and second solenoid valves 46 and 48 to control the speed ratio of the torque converter 14. The electronic control unit 64 includes a central processing unit (CPU) 66 for performing the computations, a read only memory (ROM) 68 preliminarily storing the control program and data such as various tables, and a random access memory (RAM) 70 for temporarily storing the output signals from the various detecting means and the results of the computations.

The electronic control unit 64 further includes an input circuit 72 to which the engine speed detecting means 50, the main shaft speed detecting means 52, the slope detecting means 53, the shift position detecting means 54, the throttle angle detecting means 60, and the vehicle speed detecting means 62 are connected, and an output circuit 74 to which the first solenoid valve 46 and the second solenoid valve 48 are connected. Thus, the CPU 66 in the electronic control unit 64 performs computations on the various signals input through the input circuit 72 and on the data stored in the ROM 68 according to the control program to be hereinafter described, and controls the values of currents supplied through the output circuit 74 to the first and second solenoid valves 46 and 48. Accordingly, the engagement force of the lock-up clutch 24 can be changed to control the speed ratio of the torque converter 14.

Figure 5:
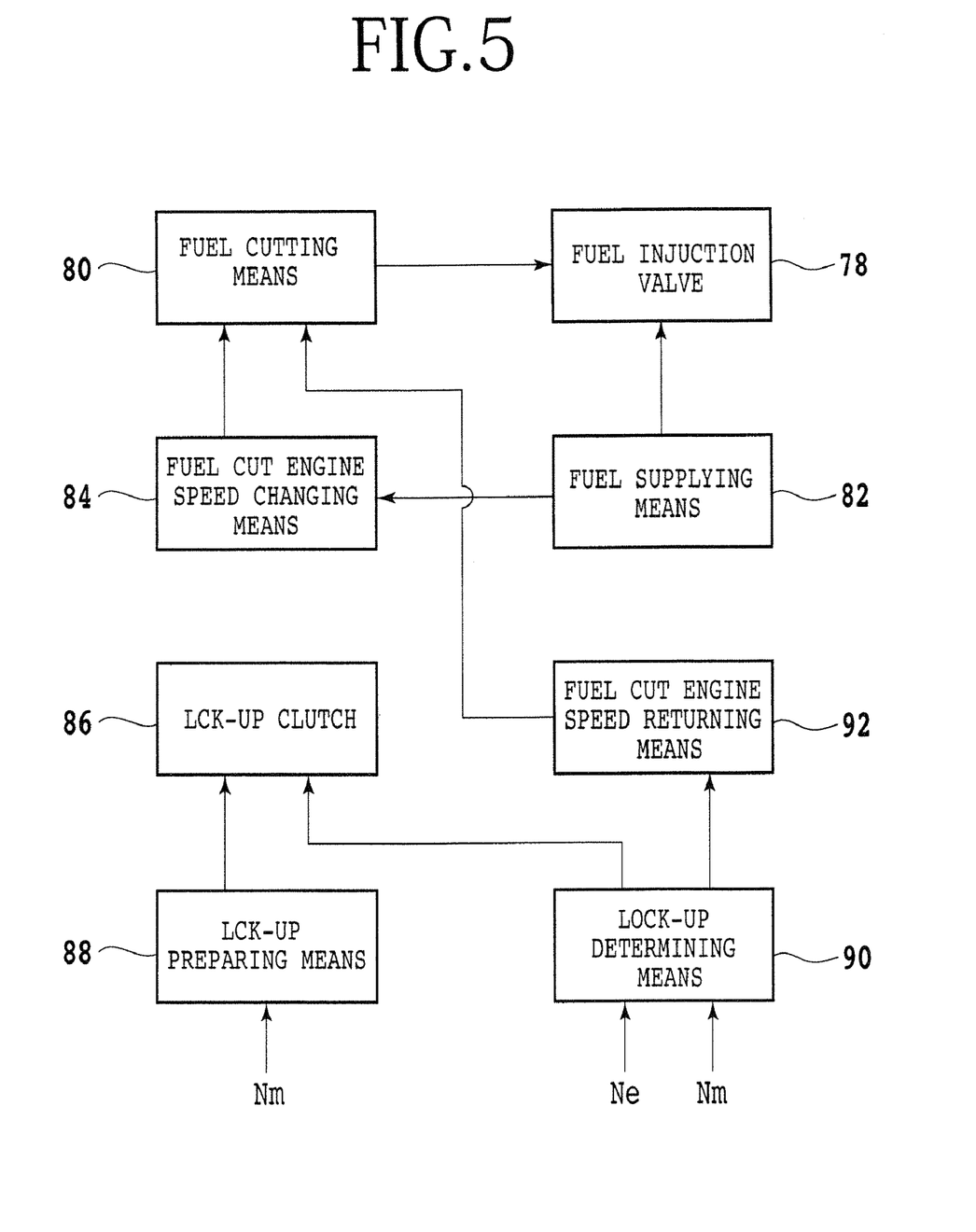
FIG. 5 is a block diagram showing the principle of the present invention.

Referring to FIG. 5, there is shown a block diagram showing the principle of the present invention. Fuel cutting means 80 functions to cut off the supply of fuel to a fuel injection valve 78 mounted on the engine when the engine speed has become greater than or equal to a first predetermined speed during deceleration running in the condition where the throttle angle is less than or equal to a predetermined angle. The above-mentioned condition where the throttle angle is less than or equal to a predetermined angle is a substantially fully closed condition of the throttle valve. Fuel supplying means 82 functions to supply fuel to the fuel injection valve 78 when the engine speed has become a second predetermined speed less than the first predetermined speed after the fuel cut.

Fuel cut engine speed changing means 84 functions to change the engine speed at which the fuel cutting means 80 operates to a third predetermined speed greater than the first predetermined speed when the fuel supplying means 82 has been operated. Lock-up preparing means 88 functions to start the supply of hydraulic pressure for operating a lock-up clutch 86 of the automatic transmission when the main shaft speed in the automatic transmission has become a fourth predetermined speed greater than the first predetermined speed and less than the third predetermined speed during the fuel supply to the fuel injection valve 78 of the engine in the condition where the throttle angle is less than or equal to the above predetermined angle and the fuel cut engine speed has been changed to the third predetermined speed by the fuel cut engine speed changing means 84.

Lock-up determining means 90 functions to determine that the lock-up clutch 86 has been engaged when the engine speed Ne is equal to the main shaft speed Nm. Fuel cut engine speed returning means 92 functions to returning the engine speed at which the fuel cutting means 80 operated from the third predetermined speed to the first predetermined speed when the engagement of the lock-up clutch 86 has been determined by the lock-up determining means 90. According to the present invention having the above configuration, during running on a downhill road at low vehicle speeds, engine brake can be produced at a lower vehicle speed without the occurrence of engine hunting due to the fuel cut, so that the drivability can be improved. Further, during running on a general road, the frequency of running in the condition where no fuel cut is performed, i.e., in the condition where a sense of free running is felt can be reduced, so that the improvement in drivability and fuel economy can be expected.

Figure 6:
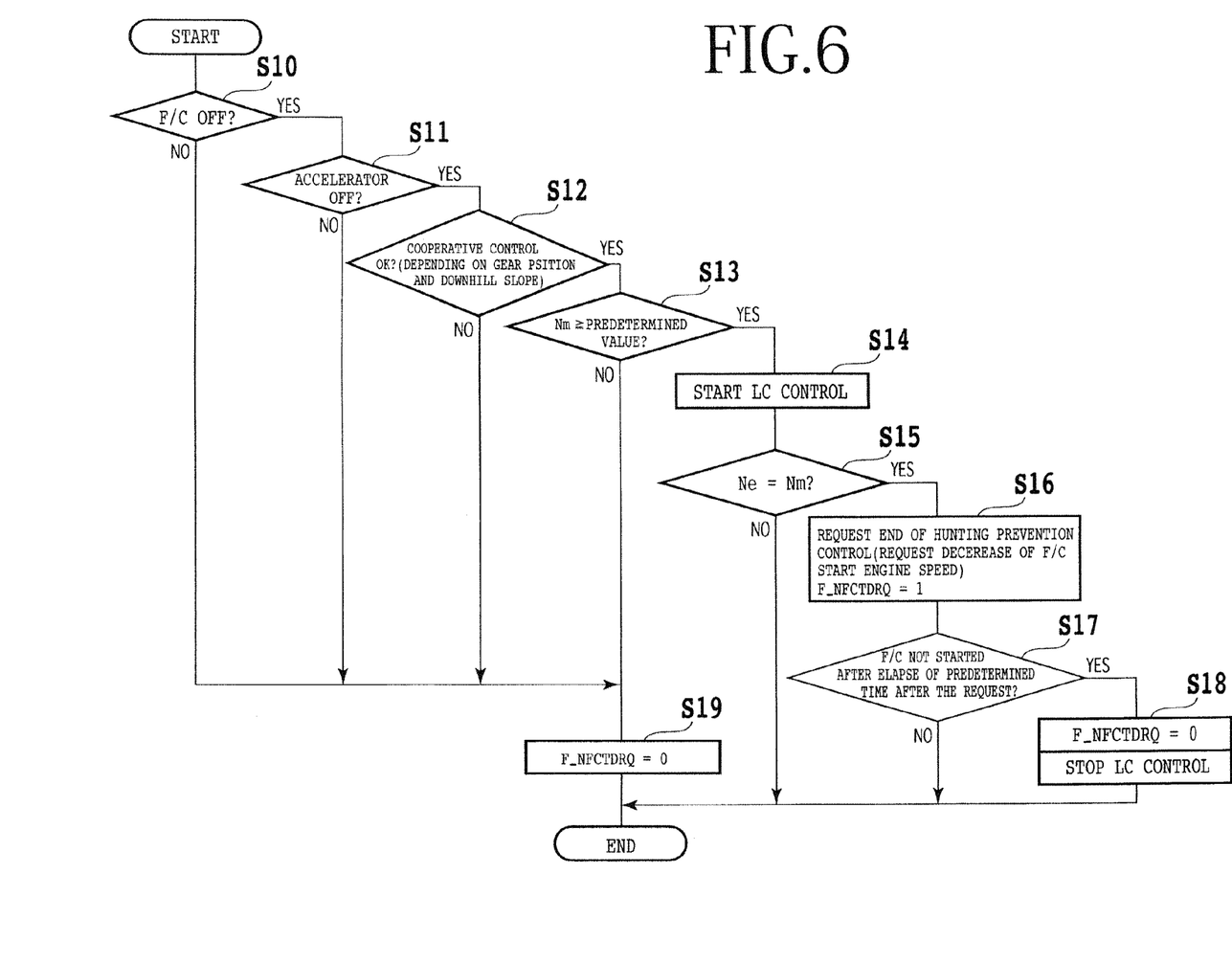
FIG. 6 is a flowchart showing the control sequence of deceleration LC/FI cooperative control according to a preferred embodiment of the present invention.

The cooperative control sequence of the lock-up clutch engagement control and the fuel cut control according to a preferred embodiment of the present invention will now be described with reference to the flowchart shown in FIG. 6. In step S10, it is determined whether or not the fuel cut (F/C) is not being performed. If the answer in step S10 is affirmative, i.e., if the fuel cut is not being performed, the program proceeds to step S11 to determine whether or not the accelerator pedal is off, i.e., whether or not the accelerator pedal is not depressed. If the answer in step S11 is affirmative, i.e., if the accelerator pedal is not depressed, the program proceeds to step S12 to determine whether or not the deceleration LC/FI (fuel injection) cooperative control according to the present invention is to be performed according to a gear position and a downhill slope. In this deceleration LC/FI cooperative control, the criterion by which this control is to be performed is changed according to a gear position in such a manner that this control is performed more at lower gear positions on steeper downhill roads.

In the case of a five-speed AT (automatic transmission), for example, this control is not performed at the first gear position in spite of a steep downhill road because sufficient engine brake can be produced. At the second gear position, this control is performed on a steep downhill road only because engine brake is excessive on a gentle downhill road. At the fifth gear position, this control is performed from on a gentle downhill road to on a steep downhill road. By this control, engine brake can be produced and fuel economy can also be improved. If the answer in step S12 is affirmative, the program proceeds to step S13 to determine whether or not the main shaft speed Nm is greater than or equal to a predetermined value. If the answer in step S13 is affirmative, the program proceeds to step S14 to start the control of the lock-up clutch (LC). In other words, the supply of hydraulic pressure for operating the lock-up clutch is started.

The program next proceeds to step S15 to determine whether or not the engine speed Ne has become equal to the main shaft speed Nm. In other words, it is determined whether or not the lock-up clutch has been engaged. If the answer in step S15 is affirmative, the program proceeds to step S16 to output a request for the decrease of an F/C (fuel cut) start engine speed. In other words, a request for the end of hunting prevention control is output, and an F/C start engine speed decrease request flag F_NFCTDRQ is set to 1. Accordingly, the F/C start engine speed is returned (lowered) to a normal F/C start engine speed, i.e., an F/C start engine speed after accelerator pedal depression.

The program next proceeds to step S17 to determine whether or not the fuel cut is not started even after the elapse of a predetermined time after the request for the decrease of the F/C start engine speed. If the answer in step S17 is affirmative, the program proceeds to step S18 to reset the F/C start engine speed decrease request flag F_NFCTDRQ to 0 and to stop the engagement control of the lock-up clutch. Accordingly, the engine speed is increased, so that the fuel cut can be easily started. If the answer in step S10, S11, S12, or S13 is negative, the program proceeds to step S19 to reset the F/C start engine speed decrease request flag F_NFCTDRQ to 0 and to end this processing. Further, if the answer in step S15 or S17 is negative, this program is ended. Further, after the execution of step S18, this program is ended.

Figure 7:
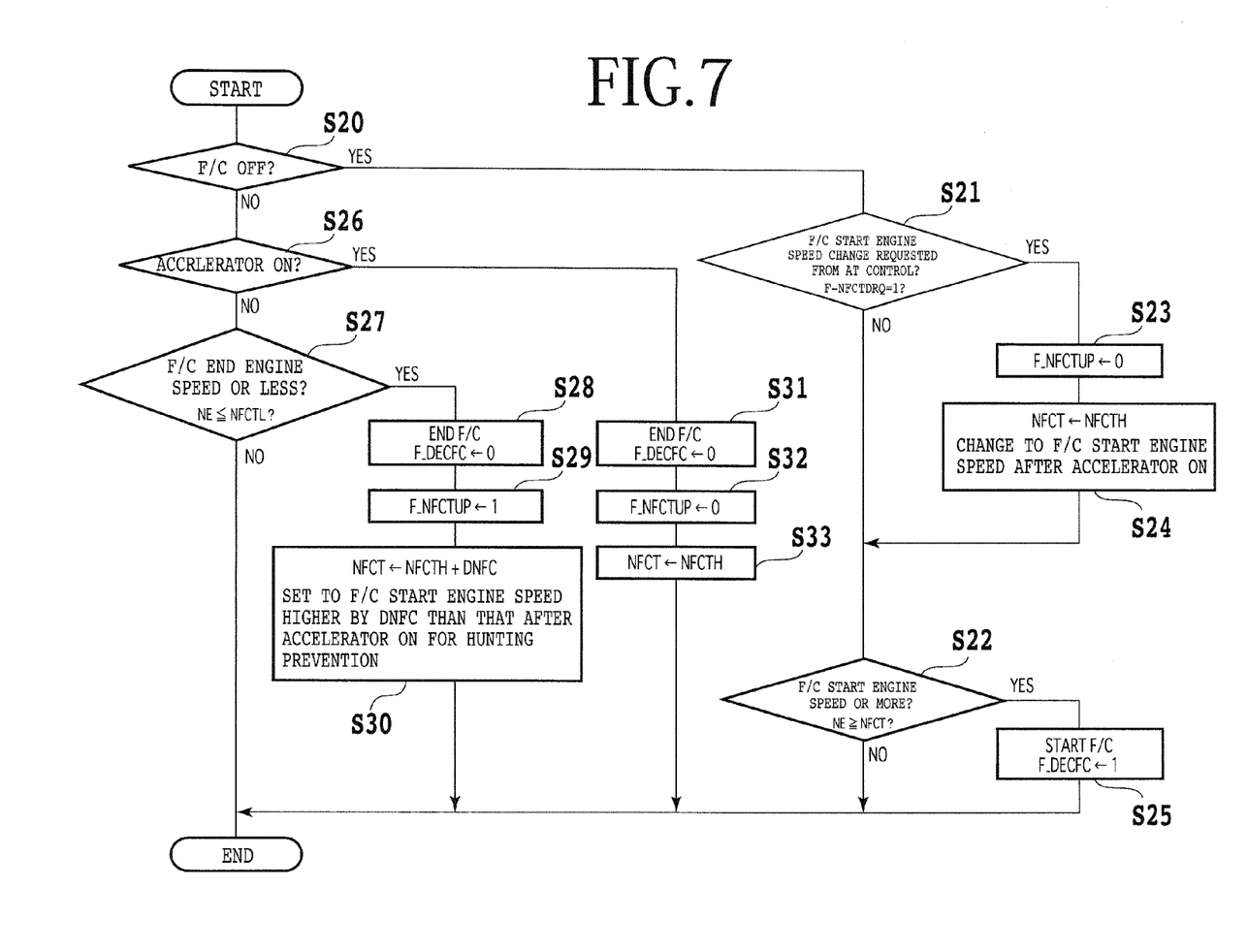
FIG. 7 is a flowchart showing the fuel cut decision sequence in the deceleration LC/FI cooperative control according to the preferred embodiment of the present invention.

The fuel cut decision sequence in the deceleration LC/FI cooperative control will now be described with reference to the flowchart shown in FIG. 7. In step S20, it is determined whether or not the fuel cut is not being performed. If the fuel cut is not being performed, the program proceeds to step S21 to determine whether or not the request for the change of the F/C start engine speed has been received from the automatic transmission lock-up control described above with reference to FIG. 6. In other words, it is determined whether or not the F/C start engine speed decrease request flag F_NFCTDRQ is on.

If the answer in step S21 is negative, the program proceeds to step S22 to determine whether or not the engine speed Ne is greater than or equal to an F/C start engine speed (NFCT). If the answer in step S21 is affirmative, the program proceeds to step S23 to reset a hunting prevention control flag F_NFCTUP to 0. The program next proceeds to step S24 to substitute a normal F/C start engine speed NFCTH for the F/C start engine speed NFCT. In other words, the F/C start engine speed increased by a predetermined speed is changed to the F/C start engine speed after accelerator pedal depression. If the answer in step S22 is affirmative, the program proceeds to step S25 to start the fuel cut and to set a fuel cut flag F_DECFC to 1.

If in step S20 the fuel cut is being performed, the program proceeds to step S26 to determine whether or not the accelerator pedal has been depressed. If the answer in step S26 is negative, the program proceeds to step S27 to determine whether or not the engine speed is less than or equal to a fuel cut end engine speed, i.e., whether or not Ne≦NFCTL. If the answer in step S27 is affirmative, the program proceeds to step S28 to end the fuel cut and to reset the fuel cut flag F_DECFC to 0. The program next proceeds to step S29 to set the hunting prevention control flag F_NFCTUP to 1.

The program next proceeds to step S30 to set the fuel cut start engine speed NFCT to a value higher by a predetermined speed DNFC than the fuel cut start engine speed after accelerator pedal depression for the purpose of hunting prevention. The predetermined speed DNFC means an F/C engine speed increased amount during the hunting prevention control. If the answer in step S26 is affirmative, the program proceeds to step S31 to end the fuel cut and to reset the fuel cut flag F_DECFC to 0. The program next proceeds to step S32 to reset the hunting prevention control flag F_NFCTUP to 0. The program next proceeds to step S33 to substitute the F/C start engine speed NFCTH for the F/C start engine speed NFCT.

Figure 8:
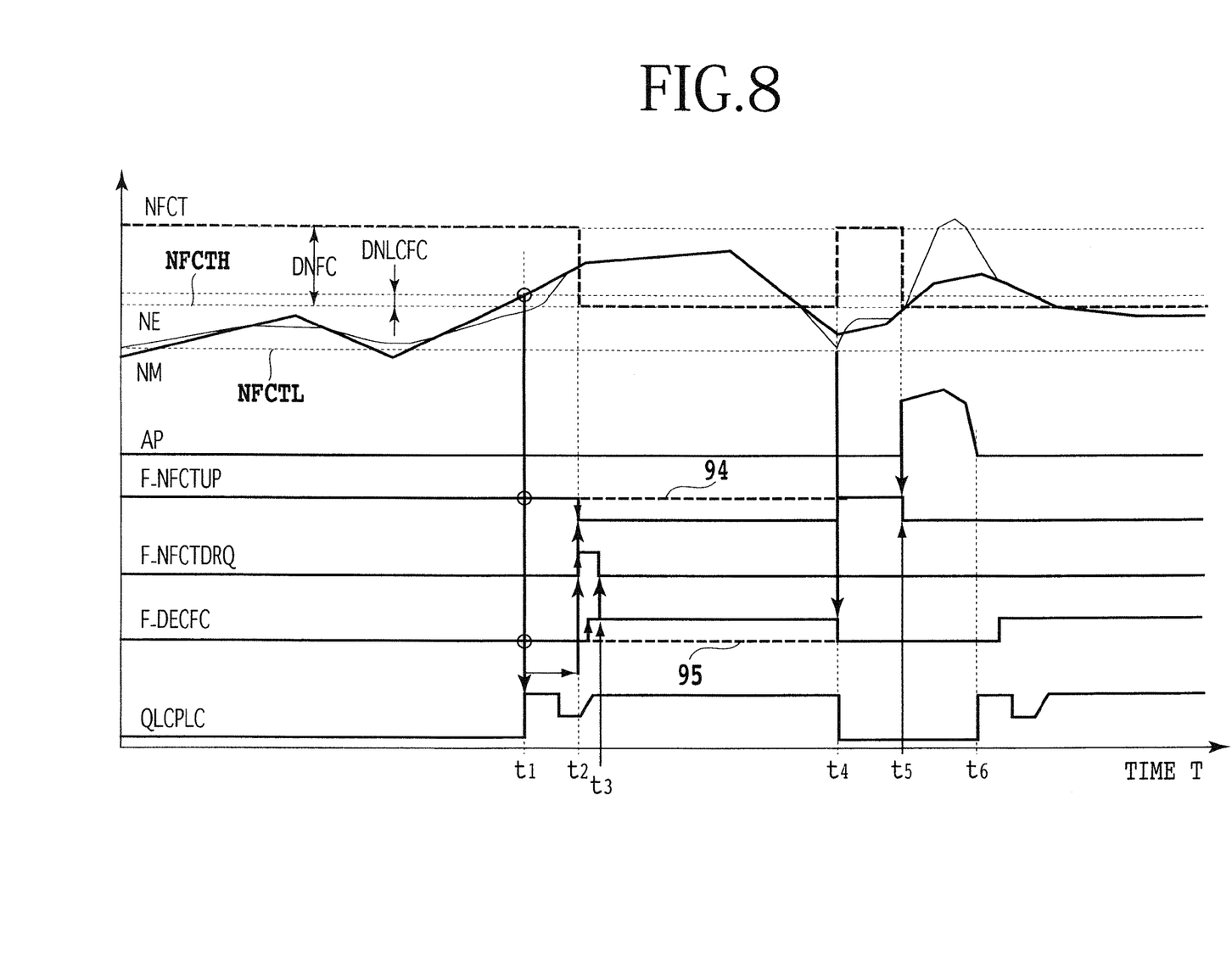
FIG. 8 is a time chart showing the deceleration LC/FI cooperative control according to the preferred embodiment of the present invention.

The deceleration LC/FI cooperative control according to the present invention will now be described more specifically with reference to the time chart shown in FIG. 8. In FIG. 8, NFCT is the F/C start engine speed, NE is the engine speed, NM is the main shaft speed, AP is the accelerator pedal angle, F_NFCTUP is the hunting prevention control flag, F_NFCTDRQ is the F/C start engine speed decrease request flag, F_DECFC is the fuel cut flag, and QLCPLC is the LC (lock-up clutch) control capacity. Further, DNFC is the F/C engine speed increased amount during the hunting prevention control, and DNLCFC is the deceleration LC/FI cooperative control start determination ANM, which means a difference between the main shaft speed NM at the start of the LC control and the F/C start engine speed after accelerator pedal depression. Further, NFCTH is the normal F/C start engine speed, and NFCTL is the engine speed after restoring the fuel supply (F/C end engine speed).

It should be noted that the time chart shown in FIG. 8 starts from the condition where the fuel supply has been restored once after the fuel cut and the F/C start engine speed NFCT has been increased. At the time t1, the main shaft speed NM is equal to the F/C start engine speed NFCTH+DNLCFC, so that the engagement control of the lock-up clutch is started. In other words, the supply of hydraulic pressure for operating the lock-up clutch is started. At the time t2, the main shaft speed NM is equal to the engine speed NE, so that it is determined that the lock-up clutch has been engaged. At this time, the F/C start engine speed decrease request flag F_NFCTDRQ is set to 1, and the request for the decrease of the F/C start engine speed is transmitted to the engine control ECU.

When this request is received by the engine control ECU, the hunting prevention control flag F_NFCTUP is reset to 0, and the F/C start engine speed NFCT is lowered to the F/C start engine speed NFCTH after accelerator pedal depression. As a result, the engine speed NE becomes greater than NFCT, and the fuel cut is started with a predetermined time of delay. After starting the fuel cut, the F/C start engine speed decrease request flag F_NFCTDRQ is reset to 0 at the time t3.

In the time chart shown in FIG. 8, the broken lines 94 and 95 show conventional control different from the cooperative control according to the present invention. As shown by the broken line 94, the hunting prevention control flag F_NFCTUP is on, and the engine speed NE is less than NFCT. Accordingly, the fuel cut is not started as shown by the broken line 95. At the time t4, the engine speed NE becomes less than the F/C end engine speed, so that the fuel cut is stopped. At this time, the F/C start engine speed NFCT is increased, and the hunting prevention control flag F_NFCTUP is set to 1.

At the time t5, the accelerator pedal is depressed, and the fuel cut is kept off. At this time, the F/C start engine speed NFCT is lowered to the F/C start engine speed NFCTH after accelerator pedal depression. At the time t6, the accelerator pedal is returned to the undepressed condition. At this time, the engine speed NE is greater than NFCT, so that the fuel cut is started with a predetermined time of delay. Further, the main shaft speed NM is greater than NFCT+DNLCFC at this time, so that the engagement control of the lock-up clutch is started.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A control device for a vehicle comprising:
a fuel supply control device for an engine having fuel cutting means for cutting off the supply of fuel to said engine when the engine speed has become greater than or equal to a first predetermined speed during deceleration running in a condition where the throttle angle is less than or equal to a predetermined angle, fuel supplying means for supplying fuel to said engine when the engine speed has become a second predetermined speed less than said first predetermined speed after the fuel cut by said fuel cutting means, and fuel cut engine speed changing means for changing the engine speed at which said fuel cutting means operates to a third predetermined speed greater than said first predetermined speed when said fuel supplying means has been operated;

an automatic transmission having a torque converter with a lock-up clutch;

lock-up preparing means for starting the supply of hydraulic pressure for operating said lock-up clutch of said automatic transmission when the main shaft speed in said automatic transmission has become a fourth predetermined speed greater than said first predetermined speed and less than said third predetermined speed during the fuel supply to said engine in a condition where the throttle angle is less than or equal to said predetermined angle and the fuel cut engine speed has been changed to said third predetermined speed by said fuel cut engine speed changing means;

lock-up determining means for determining that said lock-up clutch has been engaged when the engine speed is equal to the main shaft speed; and fuel cut engine speed returning means for returning the engine speed at which said fuel cutting means operates from said third predetermined speed to said first predetermined speed when the engagement of said lock-up clutch has been determined by said lock-up determining means.

2. The control device for a vehicle according to claim 1, further comprising slope determining means for determining a road surface slope, wherein when the gear position is a high gear position, said fuel cut engine speed returning means operates from on a gentle downhill road to on a steep downhill road, whereas when the gear position is a low gear position, said fuel cut engine speed returning means operates on only a steep downhill road having a slope greater than or equal to a predetermined value.

3. The control device for a vehicle according to claim 1, wherein when the fuel cut is not started even after the elapse of a predetermined time after the request for the change of the fuel cut start engine speed by said fuel cut engine speed returning means, said lock-up clutch is disengaged.

* * * * *